(12) United States Patent
Mushegian et al.

(10) Patent No.: US 11,009,887 B2
(45) Date of Patent: May 18, 2021

(54) SYSTEMS AND METHODS FOR REMOTE VISUAL INSPECTION OF A CLOSED SPACE

(71) Applicant: Toyota Research Institute, Inc., Los Altos, CA (US)

(72) Inventors: Konstantine Mushegian, San Francisco, CA (US); Matthew Amacker, Santa Clara, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 271 days.

(21) Appl. No.: 16/046,553

(22) Filed: Jul. 26, 2018

(65) Prior Publication Data

US 2020/0033874 A1 Jan. 30, 2020

(51) Int. Cl.
*G05D 1/02* (2020.01)
*G05D 1/00* (2006.01)
*G01C 3/06* (2006.01)

(52) U.S. Cl.
CPC .......... *G05D 1/0234* (2013.01); *G01C 3/06* (2013.01); *G05D 1/0088* (2013.01); *G05D 1/0225* (2013.01); *G05D 1/0246* (2013.01); *G05D 2201/0207* (2013.01)

(58) Field of Classification Search
CPC .. G05D 1/0234; G05D 1/0225; G05D 1/0246; G05D 1/0088; G05D 2201/0207; G01C 3/06
See application file for complete search history.

(56) References Cited

U.S. PATENT DOCUMENTS

| 5,202,661 A | 4/1993 | Everett, Jr. et al. |
| 7,706,917 B1 * | 4/2010 | Chiappetta ........... G05D 1/0225 700/245 |

(Continued)

FOREIGN PATENT DOCUMENTS

WO 2015029007 A1 3/2015

OTHER PUBLICATIONS

The future of hostage rescue could be this little robot, https://qz.com/652921/the-future-of-hostage-rescue-could-bethis-little-robot/, Apr. 2, 2018, 2 pages.

(Continued)

*Primary Examiner* — Jeff A Burke
*Assistant Examiner* — Zachary Joseph Wallace
(74) *Attorney, Agent, or Firm* — Dinsmore & Shohl LLP

(57) ABSTRACT

A system for remote visual inspection of a closed space includes a base station including a distance finder and a light emitter. The base station determines a distance to a projection surface using the distance finder and projects a pattern onto the projection surface of the closed space at a projection location on the projection surface. A robot includes a moveable base supporting an imaging device, a processor, and a storage device storing one or more non-transitory, processor-readable instructions. When executed by the processor, the instructions cause the robot to detect the pattern with the imaging device, determine a location of the robot with respect to the base station based on the pattern, and capture image data of the closed space. An external electronic device is communicatively coupled to the robot. The external electronic device receives image data and displays one or more images based on the image data.

19 Claims, 7 Drawing Sheets

(56) References Cited

U.S. PATENT DOCUMENTS

| | | | | |
|---|---|---|---|---|
| 7,720,554 | B2* | 5/2010 | DiBernardo | G01S 17/48 |
| | | | | 700/56 |
| 8,295,955 | B2* | 10/2012 | DiBernardo | G01C 3/06 |
| | | | | 700/56 |
| 8,874,261 | B2* | 10/2014 | Hein | G05D 1/024 |
| | | | | 700/245 |
| 9,701,020 | B1* | 7/2017 | Ebrahimi Afrouzi | |
| | | | | G05D 1/0219 |
| 9,921,586 | B2 | 3/2018 | Chiappetta | |
| 2003/0137268 | A1 | 7/2003 | Papanikolopoulos et al. | |
| 2009/0319083 | A1* | 12/2009 | Jones | G05D 1/0272 |
| | | | | 700/259 |
| 2012/0265391 | A1* | 10/2012 | Letsky | G05D 1/0088 |
| | | | | 701/25 |
| 2013/0138247 | A1* | 5/2013 | Gutmann | G05D 1/0274 |
| | | | | 700/253 |
| 2013/0231779 | A1* | 9/2013 | Purkayastha | B25J 9/1697 |
| | | | | 700/259 |
| 2018/0246518 | A1* | 8/2018 | Vogel | G05D 1/0274 |
| 2018/0329433 | A1* | 11/2018 | Zhao | G05D 1/0276 |

OTHER PUBLICATIONS

Robots as first responders, https://www.technologyreview.com/s/405157/robots-as-firstresponders/, Jan. 11, 2006, 3 pages.

\* cited by examiner

SYSTEMS AND METHODS FOR REMOTE VISUAL INSPECTION OF A CLOSED SPACE

TECHNICAL FIELD

The present specification generally relates to robot systems and, more specifically, to a system for remote visual inspection of a closed space using at least one robot that uses a pattern of beacons projected by a base station to determine its location within the room and image the room.

BACKGROUND

A robot may include components such as an accelerometer, a gyroscope, and/or the like to assist in a determination of a location of the robot and/or assist with navigation around a space. However, such sensors may be relatively expensive to implement and use. Additionally, use of such sensors only allows for tracking the location of a robot after calibration to a particular space. Such sensors must be recalibrated periodically if placed in a different space, or to account for drift, environmental changes, and/or the like.

Use of a visual reference frame within a space may provide a less expensive and less error-prone means for a robot to determine its location. Because robots may operate in spaces with one or more projection surfaces (e.g., a ceiling, wall, etc.), a projection surface may provide a backdrop for providing a visual reference frame. However, some projection surfaces are uniform in color or texture, thereby providing little or no identifying characteristics that may be used for visual reference purposes.

SUMMARY

In one embodiment, a system for remote visual inspection of a closed space includes a base station including a distance finder and a light emitter. The base station determines a distance to a projection surface using the distance finder and projects a pattern onto the projection surface of the closed space at a projection location on the projection surface. A robot includes a moveable base supporting an imaging device, a processor, and a storage device storing one or more non-transitory, processor-readable instructions. When executed by the processor, the instructions cause the robot to detect the pattern with the imaging device, determine a location of the robot with respect to the base station based on the pattern, and capture image data of the closed space. An external electronic device is communicatively coupled to the robot. The external electronic device receives image data and displays one or more images based on the image data.

In another embodiment, a robot includes an imaging device and a control unit. The control unit includes a processor and a memory module including non-transitory, processor-readable instructions. When executed, the instructions cause the robot to determine a first location of the robot based on a pattern projected on a projection surface, capture first image data at the first location, move to a second location, determine the second location of the robot based on the pattern projected on the projection surface, capture second image data at the second location, and transmit the first image data and the second image data to an external electronic device for display.

In yet another embodiment, a method of generating image data of a closed space includes projecting a pattern on a projection surface of the closed space, capturing first image data of the closed space with a robot at a first location, wherein the first image data includes the pattern, determining the first location of the robot within the closed space based on the image data including the pattern, moving the robot to a second location within the closed space, capturing second image data that includes the pattern of the closed space with the robot at the second location, determining the second location of the robot within the closed space based on the second image data including the pattern, generating an image of the closed space based on the first image data and the second image data, and displaying the image of the closed space on an external electronic device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein generally relate to systems and methods for remote visual inspection of a closed space using at least one robot. The systems and methods described herein generally include a base station that projects a pattern on a surface of the closed space, at least one robot that navigates within the closed space using the pattern and obtains images of the closed space, and at least one external electronic device that receives the images obtained by the at least one robot. Additionally, the base station and/or the external electronic device may transmit instructions to the robot that cause the robot to move to various locations throughout the closed space. In some embodiments, the images obtained by the robot may be used to generate a map of the closed space.

In some instances, it may be necessary to image the contents of a room or other closed space before one or more people, other animals, and/or other systems enter the room. The system described herein includes a base station that can be inserted into a closed space and an associated robot(s) that can image the closed space and transmit image data out of the closed space to an external electronic device. This device could be useful, for example, in a burning building, a collapsed building, a mine, a cave, etc. where one or more people, animals, and/or objects need to be emergently recovered, but where responders may not be aware of the surroundings. The robot may map the space and provide image data that may be viewed and classified to determine the contents, characteristics, and/or the like of the closed space. Using the systems and methods described herein, it may be possible to determine if there are people in the affected space without sending in first responders.

Figure 1:
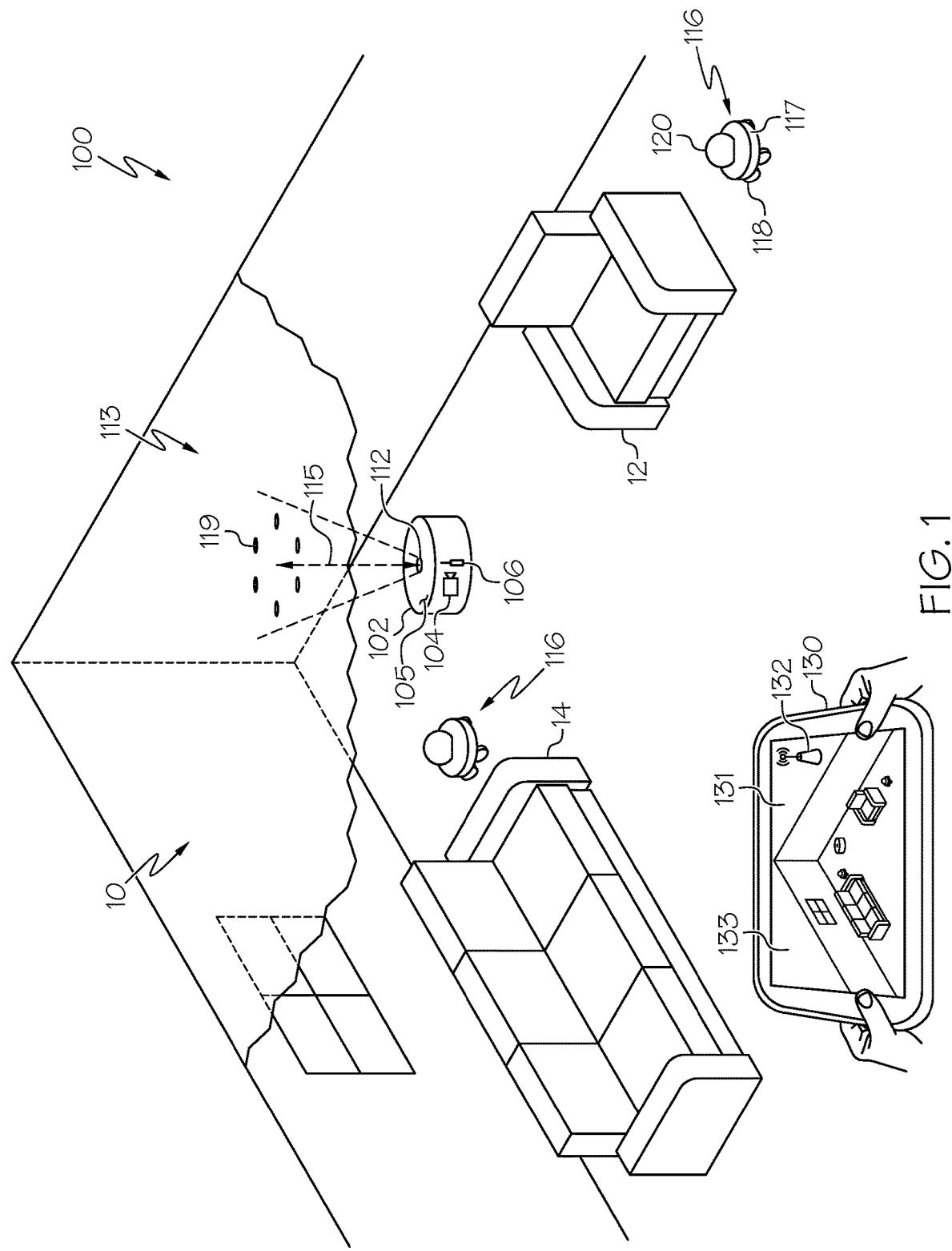
FIG. 1 depicts an exemplary embodiment of a system for remotely observing the contents of a closed space according to one or more embodiments shown and described herein.

FIG. 1 depicts a system 100 for remote visual inspection of a closed space 10. The system 100 generally includes a base station 102 and at least one robot 116. The base station 102 includes a base light emitter 112. As will be discussed in greater detail herein, the base light emitter 112 projects a pattern 119 of light at a projection location on a projection surface 113. The robot 116 includes an imaging device 120 for capturing image data of the pattern 119 and obtaining images of the closed space 10. The system 100 further includes an external electronic device 130 that is communicatively coupled (e.g., via communications hardware 132) to the base station 102 and/or the robot 116 and is generally configured to receive the images of the closed space 10 and/or direct movement of the robot 116.

Figure 2:
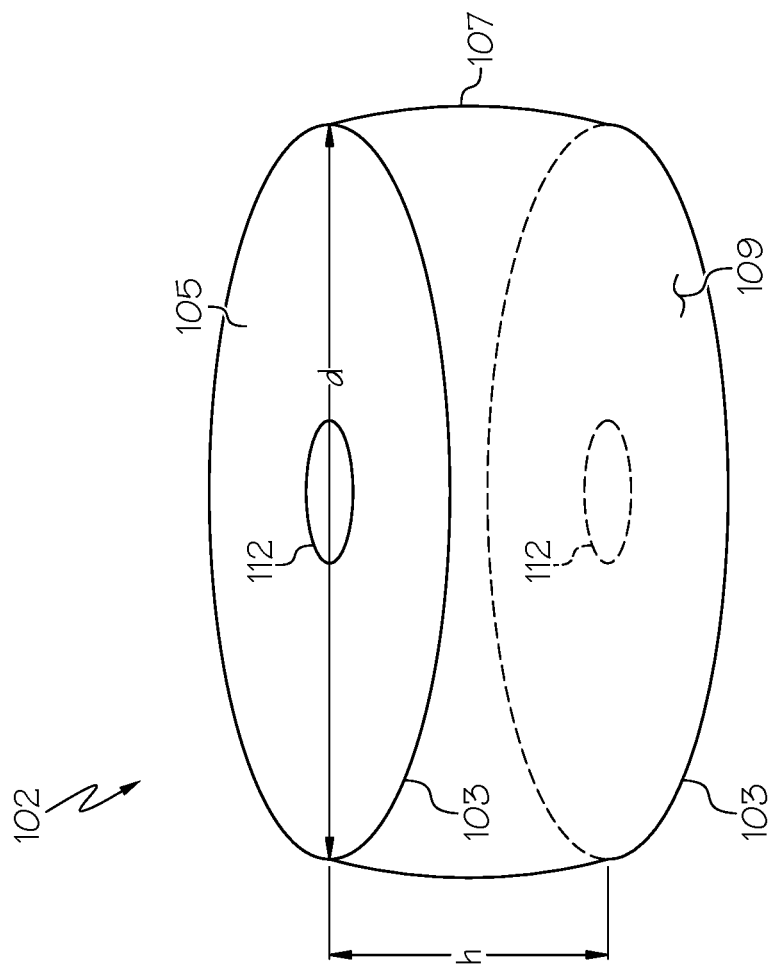
FIG. 2 depicts an illustrative base station that provides a projection according to one or more embodiments shown and described herein.

The base station 102 generally includes a base station imaging device 104, a distance finder 106, and the base light emitter 112. The base station 102 may be shaped and/or sized such that it can be held and/or thrown or otherwise moved by an ordinary human user. For example, the base station 102 may weigh between about 0.25 and about 10 pounds in some embodiments. Briefly referring to FIG. 2, the base station 102 may be a generally flat cylinder having a curved side surface 107 disposed between a planar top surface 105 and a planar bottom surface 109 that are parallel with one another in some embodiments. The planar top surface 105 and the planar bottom surface 109 may be generally circular and may have a diameter d. The curved side surface 107 may have a height h. In some embodiments, the diameter d may be greater than the height h. In some embodiments, edges 103 at an intersection of the planar top surface 105 and the curved side surface 107 and an intersection of the planar bottom surface 109 and the curved side surface 107 may be curved such that the base station 102 is unlikely to rest on the curved surface and is thus likely to land with either the planar top surface 105 or the planar bottom surface 109 facing upward (as shown in FIG. 1, the planar top surface 105 is facing upward) when tossed into a space. In some embodiments, the base station 102 may include weights or other mass distributed on the planar top surface 105 and/or the planar bottom surface 109 to bias the base station 102 toward landing with the planar top surface 105 or the planar bottom surface 109 facing upward. In some embodiments, the curved side surface 107 may be radiused outward from a center of the base station 102. Gravity tends to pull the base station 102 onto the planar top surface 105 or the planar bottom surface 109 if the base station 102 lands on its side when the base station 102 is thrown. Accordingly, the components of the base station 102 may be configured to function in instances where the base station 102 rests on a floor of the closed space 10 with its planar top surface 105 facing upward or with its planar bottom surface 109 facing upward. More specifically, with reference to FIG. 1, the base station imaging device 104, the distance finder 106, and the base light emitter 112, may be configured such that they can operate with either side of the base station 102 facing upward.

Referring to FIG. 1, the base station imaging device 104 may be any device having an array of visual sensors for detecting radiation in an ultraviolet wavelength band, a visible light wavelength band, or an infrared wavelength band and generating image data therefrom. The base station imaging device 104 may have any resolution. The base station imaging device 104 may be an omni-directional camera, a fish-eye camera, or a panoramic camera. In some embodiments, one or more optical components, such as a mirror, fish-eye lens, or any other type of lens may be optically coupled to the base station imaging device 104. In some embodiments, the base station 102 may store one or more object recognition or classification algorithms (e.g., a scale-invariant feature transform ("SIFT") algorithm).

The distance finder 106 may generally be a device that determines a distance between the base station 102 and the surface of the space onto which the pattern 119 is projected (e.g., a ceiling or a wall of the closed space 10). For example, the distance finder 106 may determine a distance from the base station 102 to the ceiling of the closed space 10. The distance finder 106 may use any type of signal to determine a distance from the base station 102 to the surface. For example, the distance finder 106 may use radar, sonar, LIDAR, LADAR, or any other signal for determining a range between the base station 102 and the projection surface 113. In some embodiments, the distance finder 106 may incorporate one or more other systems from the base station 102 to determine a distance to the projection surface 113 of the closed space 10. For example, the distance finder 106 may utilize a software program that determines a distance 115 to a surface of the closed space 10 based on capturing visual data of the pattern 119 projected by the base light emitter 112 as discussed in greater detail herein.

The base light emitter 112 may include one or more laser emitting devices, light emitting diodes (LEDs), infrared light emitting devices, and/or the like that project a pattern 119 of light onto the projection surface 113 of the closed space 10 (e.g., a ceiling or a wall surface). In addition, the base light emitter 112 may include one or more components for altering certain characteristics of the projected light (e.g., shapes, patterns, colors, wavelengths, or the like), such as a lens, a mirror, a prism, a filter, a film, a screen, and/or the like. For example, the base light emitter 112 may include one or more components that alter the light such that it is projected on the projection surface 113 as one or more shapes that may be recognized as symbols, a pattern of dots, and/or the like.

In some embodiments, the base light emitter 112 may be configured to project a dynamic projection mapping (PM) or spatial augmented reality (AR) pattern by projecting computer-generated images onto an external surface. For example, the computer generated images may be projected onto the external surface using a laser emitting device, one or more LED devices, an infrared projecting device, and/or the like, such as a DLP projector using a MEMS mirror. In some embodiments, the robot 116 may cause the imaging device 120 to obtain one or more images of the projection surface 113 and/or the base station 102 may cause the base station imaging device 104 to obtain one or more images of the projection surface 113 for the purposes of mapping the shape of the projection surface 113 and/or to measure the distance to the projection surface 113. The base station 102 may then tailor the pattern 119 emitted from the base light emitter 112 such that a virtual 3D model is projected onto the projection surface 113.

In some embodiments, the base light emitter 112 may project a pattern with features that are a calculable distance apart from one another for a height of the projection surface 113. For example, as depicted in FIG. 1, the pattern 119 may include a predetermined number of dots arranged in the pattern 119 (e.g., the six dots arranged in a hexagonal shape in FIG. 1). The base station 102 may measure, based on the angle between the light source for each dot (e.g., a laser pointer emitting the particular dot or dots), a baseline distance between each dot for a given height of the projection surface 113. This baseline distance may be used to calculate the projection surface height. For example, the base station 102 may count the number of pixels in between adjacent dots in the pattern 119 to calculate the actual distance between each dot in the pattern 119 in the image data received by the base station imaging device 104 and/or the imaging device 120. The base station 102 may compare this number of pixels to the angle between respective adjacent light emitters (e.g., the laser pointers) to calculate the projection surface height.

In some embodiments, the base station 102 may automatically calibrate the base light emitter 112 using a marker-based method in which, for example, a calibration of the interior orientation of the base light emitter 112 and/or a relative pose between the base light emitter 112 and the imaging device 120 (or the base station imaging device 104) may be calculated using a standard camera calibration algorithm. In some embodiments, the base station 102 may use one or more fiducial markers in the calibration of the base light emitter 112. For example, in some embodiments, a fiducial marker may be placed on the projection surface 113 of the closed space 10 to calibrate the base light emitter 112. In other embodiments, the location of the base station 102 within the closed space is used, along with the height of the ceiling and the angle of the light projected by the base light emitter 112, to determine the location of the features in the pattern 119.

The robot 116 includes the imaging device 120. The imaging device 120 may be any device having an array of visual sensors for detecting radiation in an ultraviolet wavelength band, a visible light wavelength band, or an infrared wavelength band. The imaging device 120 may have any resolution. The imaging device 120 may be an omni-directional camera, a fish-eye camera, or a panoramic camera. In some embodiments, one or more optical components, such as a mirror, fish-eye lens, or any other type of lens may be optically coupled to the imaging device 120. The imaging device 120 may be a thermal imaging device configured to generate thermal image data. The imaging device 120 may be configured to image upward or in another direction toward the pattern 119 projected by the base station 102 and to receive data associated with the pattern 119. Such data may be processed locally at the robot 116 or sent from the robot 116 and processed at an external location (e.g., the base station 102, the external electronic device 130, etc.). Accordingly, one or more of the processors of the robot 116, the base station 102, and the external electronic device 130 may be configured to recognize and process the image data received by the imaging device 120 and cause the robot 116 to determine its location within the closed space 10 in relation to the base station 102 based on the visual data (i.e., the pattern 119).

The external electronic device 130 may generally be a device that is located external from the closed space 10 and communicatively coupled to the base station 102 and/or the robot 116 such that a user can remotely view the images obtained by the base station 102 and/or the robot 116 and/or provide inputs. Accordingly, the external electronic device 130 may include at least an input device 131 and a display 133. The display 133 may be a remote display. While the present disclosure generally relates to an external electronic device 130 that is externally located, it is not limited thereto. That is, the external electronic device 130 may be located within the closed space 10 in some embodiments. For example, a user of the external electronic device 130 may be located within the same space as the base station 102 and/or the robot 116, but unable to view certain areas of the closed space 10 due to obstructions or the like.

The display 133 of the external electronic device 130 may generally be a component that provides a visual output. For example, the display 133 may display a location of the base station 102, the robot 116, and/or various statuses, controls, or communications related to the system 100. In some embodiments, the display 133 may display images (e.g., still images and/or a live video feed) of the closed space 10 that are received from the base station 102 and/or the robot 116. The display 133 may include any component capable of providing a visual output such as, for example, a cathode ray tube, light emitting diodes, a liquid crystal display, a plasma display, or the like. In some embodiments, the display 133 may be a touchscreen display that, in addition to providing optical information, detects the presence and location of a tactile input upon a surface of or adjacent to the display 133. In some embodiments, the display 133 may be a display of a portable electronic device such as a smart phone, tablet, laptop or the like that is communicatively coupled to the base station 102 and/or the robot 116.

The input device 131 may generally be any device that receives one or more user inputs and transforms the user inputs into a data signal. For example, the input device 131 may be a button, a lever, a switch, a knob, a touch sensitive interface, a microphone, an imaging device, or the like. In some embodiments, the input device 131 may include a pressure sensor, a touch-sensitive region, a pressure strip, or the like. It should be understood that some embodiments may not include the input device 131 or may include a plurality of input devices 131.

Figure 3:
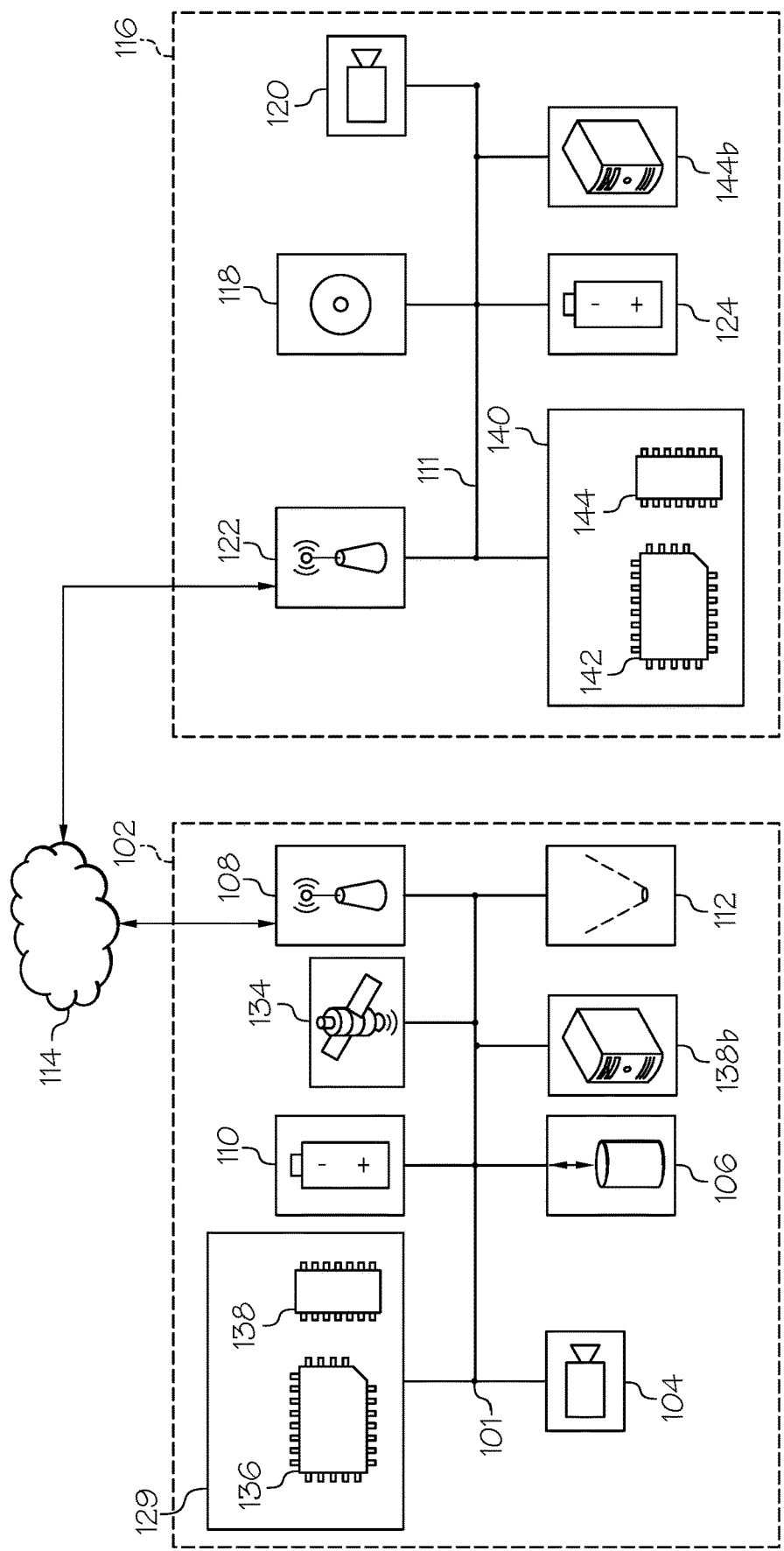
FIG. 3 depicts a schematic diagram of illustrative internal components of a base station and illustrative internal components of a robot according to one or more embodiments shown and described herein.

Referring now to FIG. 3, the various internal components of the base station 102 and the various internal components of the robot 116 are depicted. In some embodiments, the base station 102 may include a base station electronic control unit (ECU) 129 including a processor 136 and a non-transitory processor readable memory module 138, a battery module 110, a location sensor 134, network interface hardware 108, the base light emitter 112, the distance finder 106, the base station imaging device 104, and a base station storage device 138b communicatively coupled to one another via a communication path 101.

Still referring to FIG. 3, and also with reference to FIG. 1, in some embodiments, the robot 116 may include a robot communications module 122, a motorized wheel assembly 118 supported to a body 117 thereof, an imaging device 120, a robot ECU 140 including a robot processor 142 and a non-transitory processor readable memory module 144, a robot battery module 124, and a robot storage device 144b. The components of the robot 116 may be communicatively coupled to one another via a robot communication path 111. The various internal components of the base station 102 may also be communicatively coupled to the various internal components of the robot 116 via a network 114, as described in greater detail herein.

The communication path 101 may be formed from any medium that is capable of transmitting a signal such as, for example, conductive wires, conductive traces, optical waveguides, or the like. The communication path 101 may also refer to the expanse in which electromagnetic radiation and their corresponding electromagnetic waves traverses. Moreover, the communication path 101 may be formed from a combination of mediums capable of transmitting signals. In one embodiment, the communication path 101 includes a combination of conductive traces, conductive wires, connectors, and buses that cooperate to permit the transmission of electrical data signals to components such as processors, memories, sensors, input devices, output devices, and communication devices. Accordingly, the communication path 101 may include a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 101 communicatively couples the various components of the base station 102. As used herein, the term "communicatively coupled" means that coupled components are capable of exchanging signals with one another such as, for example, electrical signals via conductive medium, electromagnetic signals via air, optical signals via optical waveguides, and the like.

The base station ECU 129 may be any device or combination of components including one or more processors 136 and one or more non-transitory processor readable memory modules 138. The base station ECU 129 may include any device capable of executing one or more machine-readable instruction sets stored in any non-transitory processor readable memory. Accordingly, the base station ECU 129 may include an electric controller, an integrated circuit, a microchip, a computer, or any other computing device. While the base station ECU 129 depicted in FIG. 3 includes a single processor 136, other embodiments may include more than one processor.

The non-transitory processor readable memory module 138 of the base station ECU 129 may include RAM, ROM, flash memories, hard drives, or any non-transitory memory device capable of storing machine-readable instructions such that the machine-readable instructions can be accessed and executed. The machine-readable instruction set may include logic or algorithm(s) written in any programming language of any generation (e.g., 1GL, 2GL, 3GL, 4GL, or 5GL) such as, for example, machine language that may be directly executed by the base station ECU 129, or assembly language, object-oriented programming (OOP), scripting languages, microcode, etc., that may be compiled or assembled into machine readable instructions and stored in the non-transitory processor readable memory module 138. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 3 includes the base station ECU 129 with a single non-transitory processor readable memory module 138, other embodiments may include more than one memory module.

Embodiments of the base station 102 may include the battery module 110. The battery module 110 may include a DC power source for supplying electric power to the base station 102 and its components. For example, the battery module 110 may supply power to the robot 116 and components thereof in addition to the base station 102 and its components. The battery module 110 may include one or more devices configured to plug the battery module 110 into a standard 110 V AC wall socket, for example, a wall socket in a typical American home in order to charge the battery module 110. In some embodiments, the battery module 110 may be configured with one or more batteries, such as a Li-ion battery, such that when the battery module 110 is plugged into a wall, the battery module 110 can store power to provide to one or more components of the system 100.

Still referring to FIG. 3, in some embodiments, the robot 116 may recharge at the base station 102 as will be described in greater detail herein. In some embodiments, the robot 116 may wirelessly charge using inductive charging at the base station 102. The battery module 110 may be configured to supply electrical power to the robot 116 until the robot 116 is fully charged and/or until the robot 116 has a sufficient charge to travel to a designated area of the closed space 10. In some embodiments, the battery module 110 is configured to monitor a battery level of the robot 116 and to transmit instructions or cause instructions to be sent to the robot 116 to return to the base station 102 to recharge its own battery as will be described in greater detail herein. In some embodiments, the base station 102 may project a particular symbol using the base light emitter 112 that is recognized by the robot 116 and causes the robot 116 to return to the base station 102 to recharge its batteries.

The location sensor 134 may be positioned on the base station 102. In some embodiments, the location sensor 134 may serve as a backup location detection feature, for example, if the robot 116 cannot detect the pattern 119 projected by the base station 102. In some embodiments, the location sensor 134 is selectively actuable based on whether or not the robot 116 can determine its location with respect to the base station 102 using the imaging device 120 as described herein. The location sensor 134 may be any device capable of generating an output indicative of a location. In some embodiments, the location sensor 134 includes a global positioning system (GPS) sensor, though embodiments are not limited thereto. Some embodiments may not include the location sensor 134, such as embodiments in which the base station 102 does not determine a location of the base station 102 or embodiments in which the location is determined in other ways (e.g., based on information received from the base station imaging device 104 or the robot 116, or the like). The location sensor 134 may also be configured as a wireless signal sensor capable of triangulating a location of the base station 102 and/or one or more users or objects of interest (e.g., furniture such as a chair 12 or a sofa 14) by way of wireless signals received from one or more wireless signal antennas. In one or more embodiments, the base station 102 may be configured to identify its location using the location sensor 134 and to encrypt and transmit its location data to an external device (e.g., the external electronic device 130). For example, the base station 102 may transmit its location data (either encrypted or unencrypted) over a network to the external electronic device 130.

The network interface hardware 108 may be any device capable of transmitting and/or receiving data via a network as will be described in greater detail herein. Accordingly, network interface hardware 108 can include a communication transceiver for transmitting and/or receiving any wireless communication. For example, the network interface hardware 108 may include an antenna, Wi-Fi card, WiMax card, mobile communications hardware, near-field communication hardware, satellite communication hardware and/or any wireless hardware for communicating with other networks and/or devices (e.g., hardware for communicating via a Bluetooth or 5G connection). In one embodiment, network interface hardware 108 includes hardware configured to operate in accordance with the Bluetooth wireless communication protocol. In another embodiment, network interface hardware 108 may include a Bluetooth send/receive module for transmitting and receiving Bluetooth communications to/from a network.

Still referring to FIG. 3, the robot communication path 111 may be formed from any medium that is capable of transmitting a signal such as, for example, conductive wires, conductive traces, optical waveguides, or the like. The robot communication path 111 may also refer to the expanse in which electromagnetic radiation and their corresponding electromagnetic waves traverses. Moreover, the robot communication path 111 may be formed from a combination of mediums capable of transmitting signals. In one embodiment, the robot communication path 111 includes a combination of conductive traces, conductive wires, connectors, and buses that cooperate to permit the transmission of electrical data signals to components such as processors, memories, sensors, input devices, output devices, and communication devices. Accordingly, the robot communication path 111 may include a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The robot communication path 111 communicatively couples the various components of the robot 116. As used herein, the term "communicatively coupled" means that coupled components are capable of exchanging signals with one another such as, for example, electrical signals via conductive medium, electromagnetic signals via air, optical signals via optical waveguides, and the like.

The robot ECU 140 may be any device or combination of components including one or more processors, such as the robot processor 142, and one or more non-transitory processor readable memory modules 144. The robot ECU 140 may include any device capable of executing one or more machine-readable instruction sets stored in any non-transitory processor readable memory. Accordingly, the robot ECU 140 may include an electric controller, an integrated circuit, a microchip, a computer, or any other computing device. While the robot ECU 140 depicted in FIG. 3 includes a single robot processor 142 and a single non-transitory processor readable memory module 144, other embodiments may include more than one robot processor 142 and/or more than one non-transitory processor readable memory module 144.

The non-transitory processor readable memory module 144 of the robot ECU 140 may include RAM, ROM, flash memories, hard drives, or any non-transitory memory device capable of storing machine-readable instructions such that the machine-readable instructions can be accessed and executed. The machine-readable instruction set may include logic or algorithm(s) written in any programming language of any generation (e.g., 1GL, 2GL, 3GL, 4GL, or 5GL) such as, for example, machine language that may be directly executed by the robot ECU 140, or assembly language, object-oriented programming (OOP), scripting languages, microcode, etc., that may be compiled or assembled into machine readable instructions and stored in the non-transitory processor readable memory module 144. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 3 includes a robot ECU 140 with a single non-transitory processor readable memory module 144, other embodiments may include more than one memory module.

In some embodiments, the robot 116 may include a motorized wheel assembly 118 that supports and moves the robot 116. The motorized wheel assembly 118 powers the robot 116 to move within its environment (e.g., the closed space 10). The motorized wheel assembly 118 may be physically and communicatively coupled to the robot 116 and its associated systems. The motorized wheel assembly 118 may include one or more motorized wheels driven by one or more motors that receive electrical power from a robot battery module 124. The motorized wheel assembly 118 may receive a drive signal that causes the one or more motors of the motorized wheel assembly 118 to turn driving the wheels.

The robot battery module 124 may be electrically coupled to the various electrical components of the robot 116. The robot battery module 124 may include a battery that may be any device capable of storing electrical energy for later use by the robot 116. In some embodiments, the robot battery module 124 includes a rechargeable battery, such as a lithium-ion battery or a nickel-cadmium battery. In embodiments in which the robot battery module 124 includes a rechargeable battery, the robot 116 may include a charging port, which may be used to charge the robot battery module 124. Some embodiments may not include the robot battery module 124, such as embodiments in which the robot 116 is powered by the electrical grid, by solar energy, or by energy harvested from the environment. Some embodiments may not include an adaptor or wireless charging apparatus, such as embodiments in which the apparatus utilizes disposable batteries for power.

The robot communications module 122 may couple the robot 116 to an external network, to the base station 102, and/or to the external electronic device 130. The robot communications module 122 may include any device or devices capable of transmitting and/or receiving data via a wireless network. Accordingly, the robot communications module 122 can include a communication transceiver for transmitting and/or receiving any wireless communication. For example, the robot communications module may include an antenna, a Wi-Fi card, WiMax card, mobile communications hardware, near-field communication hardware, satellite communication hardware and/or any wireless hardware for communicating with other networks and/or devices. In one embodiment, the robot communications module 122 includes hardware configured to operate in accordance with the Bluetooth wireless communication protocol.

Figure 4:
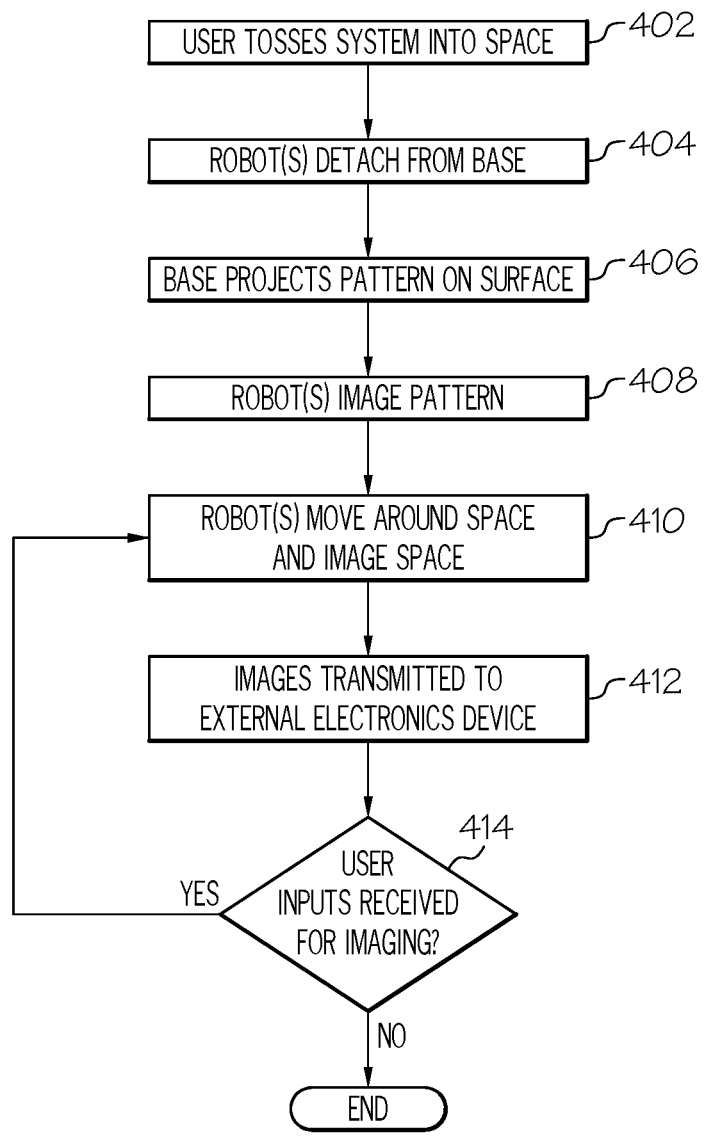
FIG. 4 depicts a flow diagram of an illustrative overview method of operating a system for remotely observing a closed space according to one or more embodiments shown and described herein.

FIG. 4 depicts a method of using the system described above. The method of FIG. 4 will be described in the context of the example scenario shown in FIG. 5 and described herein. The particular example embodiment described in FIG. 4 is not intended to limit the operation of the robot, the base station, and/or the external electronic device to any particular order or number of steps and additional or alternative steps are contemplated. It is to be understood that one or more of the steps described below, although explicitly described with respect to the robot 116 and the base station 102 of FIG. 5, could be performed by one or more other components of the system in addition to or in place of the robot in accordance with the features and applications described herein.

Figure 5:
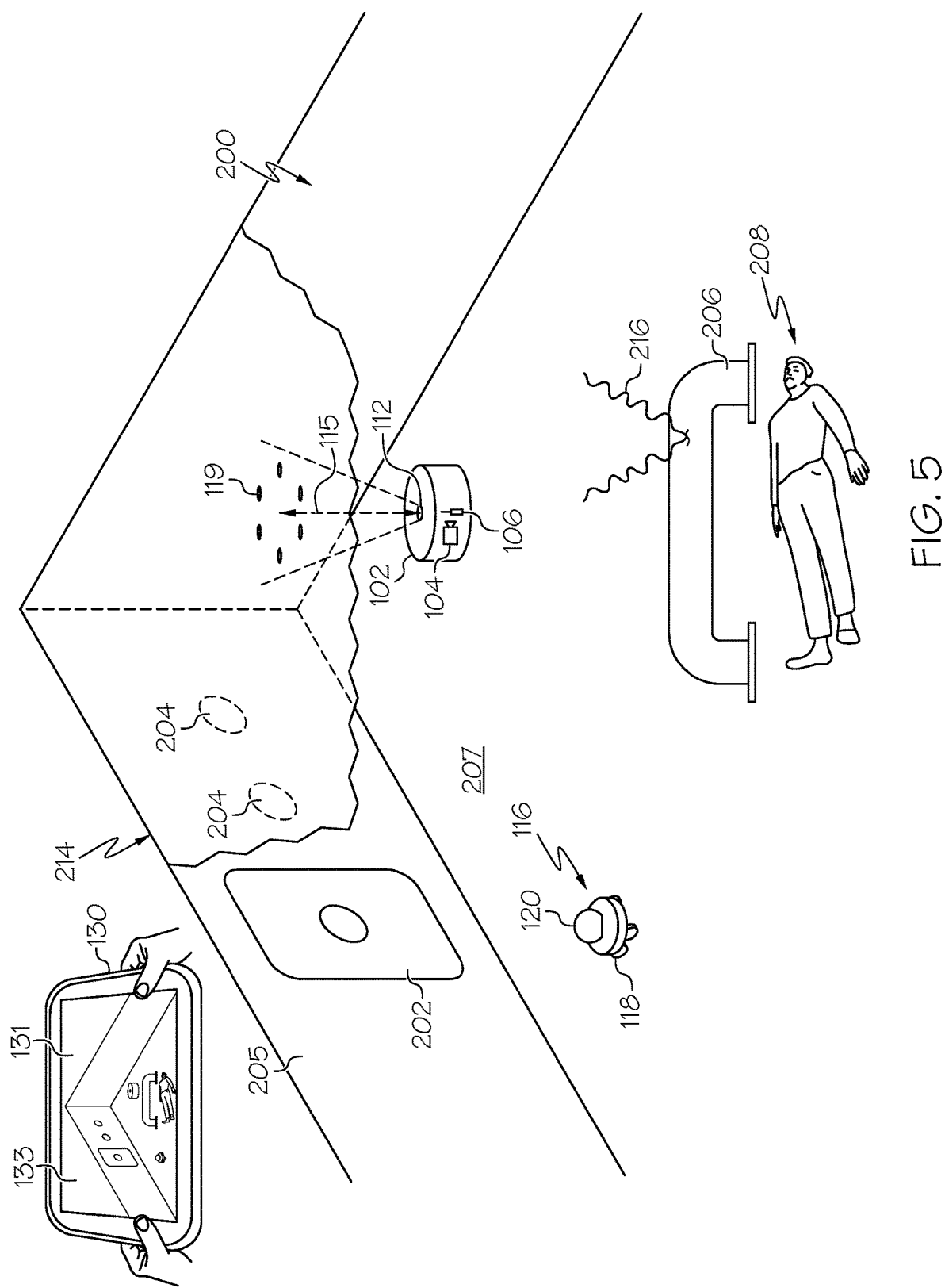
FIG. 5 schematically depicts an illustrative use of a system for remote visual inspection of a closed space according to one or more embodiments shown and described herein.

Referring to FIGS. 4 and 5, a user may toss or otherwise place a base station into the closed space at block 402. For example, a user may open a door, window, etc. to gain temporary access sufficient for the insertion of a base station. As thrown into the room, the base station may include one or more robots coupled thereto and configured to capture image data within the room. In some embodiments, the robots may be added to the room separately.

As shown in FIG. 5, a closed space 200 may include a door 202, a floor 207, windows 204 positioned in a wall 205, a ceiling 214 (i.e., ceiling 214) onto which a pattern 119 is projected by the base station 102. It is to be understood that no two spaces are entirely alike and that the embodiment illustrated in FIG. 5 is only intended as an example. The concepts described herein could be applied to any space, whether open or closed. A person 208 is immobile behind a pipe 206 and is not visible to people who may look into the closed space 200 through the windows 204. The closed space 200 may be inaccessible to people because of a steam leak 216, however, it may be possible to insert the base station 102 and the robot 116. In some embodiments, the robot 116 is connected to the base station 102 before both are inserted into the closed space 200. Accordingly, the base station 102 and the robot 116 may be inserted into the closed space as a single unit and the robot 116 may later separate from the base station 102 as described herein. As previously described herein, the base station 102 may be communicatively coupled to the robot 116 within the closed space 200 and the external electronic device 130 outside the closed space 200 that may be held and viewed by a user of the system 100 so as to transmit and/or receive information to/from the robot 116 and the external electronic device 130.

Still referring to FIGS. 4-5, the robots detach from the base station to begin moving about the room at block 404. In some embodiments, the robots detach automatically. In other embodiments, the robots may be inserted into the room separately from the base station. However, robots with one or more mechanisms for automatic detachment are contemplated. As shown in FIG. 5, the robot 116 has detached from the base station 102. The robot 116 moves around the room using the motorized wheel assembly 118. The imaging device 120 includes at least one visual sensor and is configured to capture image data of the closed space 200.

At block 406, the base station projects a pattern onto the projection surface. The pattern may be a geographic shape, a number of dots, a code (e.g., a bar code or a QR code) or any other identifying mark as described in greater detail herein. The pattern is projected upward once the base station is injected into the closed space so that the robot can image the pattern and orient itself within the closed space and begin to move around the room with respect to the base station, generating image data and sending the image data to the external electronic device.

The base station 102 may project the pattern 119 onto the ceiling 214 of the closed space 200. The base station 102 may determine a distance between the base station 102 and the projection surface 113 once it is in the closed space 200. The distance may be used as a factor to determine the location of the robot 116 with respect to the base station as described herein.

At block 408, the robot images the pattern that is projected on the projection surface using an imaging device. In some embodiments, the imaging device images upward to a projection surface that is above the robot, but it is not necessary that the projection surface be directly above the robot. It is contemplated that the projection surface may be any surface in view of the imaging device of the robot. Referring to FIG. 5, the robot 116 may image the pattern and determine its location with respect to the base station 102 within the closed space 200 as described in greater detail herein.

At block 410, the robot may move within the closed space 200 from a first location to a second location. The robot may determine its position with respect to the base station at the second location in a similar manner to the way it determined its location with respect to the first location. As shown in FIG. 5, the robot 116 may capture a second image of the closed space 200 using the imaging device 120 and may transmit the image data of the second image to the base station 102. The second image data may be compared to the first image data. In some embodiments, the robot 116 may continuously capture image data as it moves.

At block 412, the robot and/or the base station may transfer the image data to the external electronic device to create one or more visual representations of the closed space on the external electronic device. The robot and/or the base station may transfer image data to the base station using one or more data connections. As shown in FIG. 5, the base station 102 and/or the robot 116 may transfer image data to the external electronic device 130.

Still referring to FIGS. 4 and 5, the user may input one or more user inputs into the system at block 414. That is, the user may use the external electronic device to control the robot to cause the robot to capture more image data, to stop capturing image data, and/or to move to one or more other locations within the closed space. As shown in FIG. 5, the user may input one or more instructions to the robot 116 using the external electronic device 130. For example, the user may view an image on the display 133 and cause the robot 116 to move to another area of the closed space 200 using the input device 131, for example, by touching a portion of the display 133 showing an image of the closed space 200 where the user intends the robot 116 to move.

The robot 116 shown in the example embodiment of FIG. 5 may capture data that is used to classify the pipe 206, the steam leak 216, and the person 208. That is, one or more object recognition or classification algorithms may be performed on the image data to classify the objects. The object recognition or classification algorithms may be performed by processing devices on the robot, the base station, and/or the external electronic device. The images, including classified objects, may be displayed on the display 133 of the external electronic device 130, indicating to the user, who may be external to the closed space 200, the content of the closed space 200. For example, the robot 116 may image the person 208 in the closed space 200 and the image data may be processed to classify the person 208 and display the person 208 on the display 133. Accordingly, the user may know that a response team should be sent into the closed space 200 to recover the person 208 based on the steam leak 216. Additionally, because the robot 116 is oriented within the closed space 200 with respect to the base station 102, the response team can know the location of the person 208 with respect to the base station 102, enabling the response team to quickly recover the person 208 if the person 208 cannot exit the space without help.

Still referring to FIGS. 4 and 5, in some embodiments, the user inputs may cause the robot to move within the closed space and the method may return to block 410, where the robot may move around the space and capture more image data. In other embodiments, the user may determine that sufficient visual data of the space has been captured and choose not to cause the robot to move to another location within the closed space.

Figure 6:
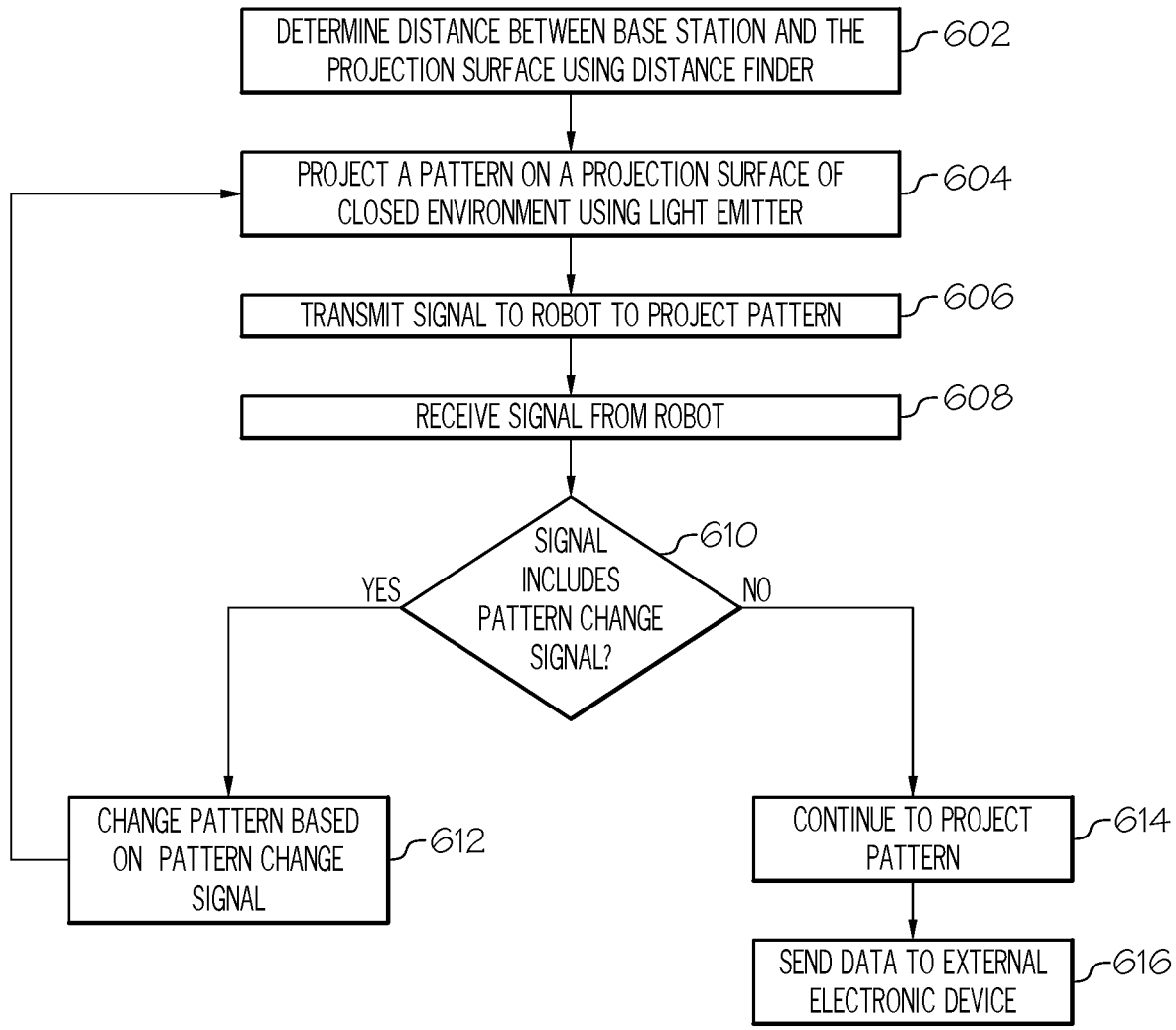
FIG. 6 depicts a flow diagram of an illustrative method of operating a robot in a closed space according to one or more embodiments shown and described herein.

Referring now to FIG. 6, a flow chart depicting an illustrative method for operating a system for remote visual inspection is described. The particular example embodiment described in FIG. 6 is not intended to limit the operation of the robot, the base station, and/or the external electronic device to any particular order or number of steps and additional or alternative steps are contemplated. It is to be understood that one or more of the steps described below, although explicitly described with respect to the robot, could be performed by the base station and/or the external electronic device.

At block 602, a distance from the base station to the projection surface is determined using the distance finder. The distance may be determined in a number of ways. For example, the distance from the base station to projection surface may be determined by transmitting a signal from the base station and measuring the time it takes for the signal to return to the base station after reflecting from the projection surface. This signal may be projected using any type of signal-forming device (e.g., LIDAR, LADAR, sonar, radar, etc.). In some embodiments, the distance finder may project and receive the signal from either side of the base station such that the distance between the base station and the projection surface can be determined no matter what the orientation of the base station (i.e., upward or downward). For example, if a user throws the base station into a closed space, the base station may land with its top surface or its bottom surface facing upward and project a signal toward a projection surface of the closed space (e.g., a ceiling).

In some embodiments, the distance may be predetermined using a setting on the base station. For example, the base station may include or be communicatively coupled to a touch pad or input device (e.g., the input device 131 of the external electronic device 130 shown in FIG. 1) that may be used to input a distance to the projection surface to determine the distance to the projection surface, for example, in closed spaces in which a ceiling height is known (e.g., a classroom, an apartment, etc.). Rather than, or in addition to, measuring the distance to the projection surface, the user may input the predetermined distance. In some embodiments, a user may update the distance remotely using a wireless connection, (e.g., once the base station has been placed in the operating environment and is no longer accessible by the user without entering the closed space). For example, the distance may be updated remotely with an estimated or known distance if the signal path from the distance finder to the projection surface is blocked or occluded.

At block 604, a pattern is projected onto the projection surface of a closed space using the light emitter of the base station. As mentioned above, the pattern may include any number of dots, and may take any shape, color, pattern, or size. Additionally, each dot (e.g., feature, fiducial mark, spot, etc.) may take any size, shape, color, pattern, or size. The particular example embodiment of the pattern 119 shown in FIG. 1 contains six dots in a hexagonal shape, but patterns are not limited to such an arrangement. The light emitter may include any type of visual, infrared, or ultraviolet light emitting apparatus or apparatuses. For example, without limitation, the light emitter may include one or more lasers, LEDs, light bulbs, infrared light bulbs, or ultraviolet light bulbs. The light emitter may project light at any angle or number of angles to form any pattern on the projection surface.

Referring again to FIG. 6, the pattern may be stored in one or more memory modules accessible by one or more of the robot, the base station, and the external electronic device. For example, the pattern may be stored in a non-transitory, processor-readable memory module (e.g., a hard drive) communicatively coupled to the base station. Data representing the pattern may be stored along with data representing a collection of other patterns, and a pattern may be selected from the collection of patterns based on one or more criteria. For example, and without limitation, a pattern may be selected based on the type and/or number of imaging devices on the robot, and/or the type and/or number of robots operating within the closed space.

Additionally, the projected pattern may be dynamic, such that it can change based on input from a user or the robot. For example, the pattern may change as the robot moves from one place to another throughout the closed space, moving with the robot so that the robot can detect the pattern from its current location regardless of where it is in the closed space. In some embodiments, the pattern may change from one color to another as the robot continues to generate image data through the closed space and additional features and area of the environment is mapped.

At block 606, the base station may transmit a signal to the robot that a pattern has been projected by the base station. This signal may trigger the robot to begin searching for the pattern. The signal may be transmitted, for example, by the network interface hardware communicatively coupled to the ECU of the base station.

At block 608, the base station may receive a signal from the robot. The data may include a detection signal indicating that the robot has detected the pattern and/or visual data, location data of the robot, and other data (e.g., robot battery level, etc.). The base station may receive the data over the wireless connection between the robot and the base station. In some embodiments, the robot may additionally or alternatively form a wireless connection with the external electronic device, and the robot may transmit data directly to the external electronic device.

Based on the content of the data, the base station may make a change to the pattern at block 610. For example, the base station may receive a pattern change signal in the data transmitted by the robot. The pattern-change signal may indicate to the base station that the pattern needs to be changed for one or more reasons. For example, and without limitation, the pattern may be occluded based on the current vantage point of the robot. In some embodiments, the base station may receive the pattern-change signal when the robot determines that it cannot capture an image of the pattern for a certain amount of time, for example, the base station may receive a pattern-change signal from the robot if the robot has not detected the pattern for five seconds from its current location. It is to be understood that other amounts of time are considered and the criteria for sending the pattern-change signal is not merely temporal. For example, in embodiments in which the robot receives task instructions through the pattern, generation of the pattern-change signal may be based on the robot having completed one or more tasks.

At block 612, the base station may change the pattern based on having received the pattern change signal. In embodiments, the base station may change one or more aspects about the pattern. For example, without limitation, the base station may change the number and/or type of feature displayed in the pattern (e.g., may change from dots to squares, etc.). In some embodiments, the base station may change a different aspect of the pattern, for example, without limitation, the color, size, shape, and/or the pattern of features that make up the pattern. In some embodiments, the base station may change a projection angle of the pattern, such that the pattern is projected on a different area of the surface. The base station may change the projection angle of the pattern, for example, by moving one or more projectors that create the projected light, LED, infrared, or ultraviolet light that makes up the feature(s) in the pattern. If the base station changes the pattern based on the pattern change signal, the base station may project the new pattern on the projection surface of the closed environment, returning to block 604.

If the data transmitted from the robot and received by the base station does not include a pattern change signal, the base station may continue to project the pattern at block 614 and at block 616, the base station may transmit data to the external electronic device. In some embodiments, this data may include data received from the robot. In some embodiments, the base station may process some or all of the data from the robot before it is sent to the external electronic device. For example, the base station may perform one or more object recognition or facial recognition algorithms on the data. The base station may transmit data to the external electronic device using the network interface hardware and the external electronic device may receive the data using the device communications module. Accordingly, the data may be sent over a 5G or a Bluetooth connection.

Figure 7:
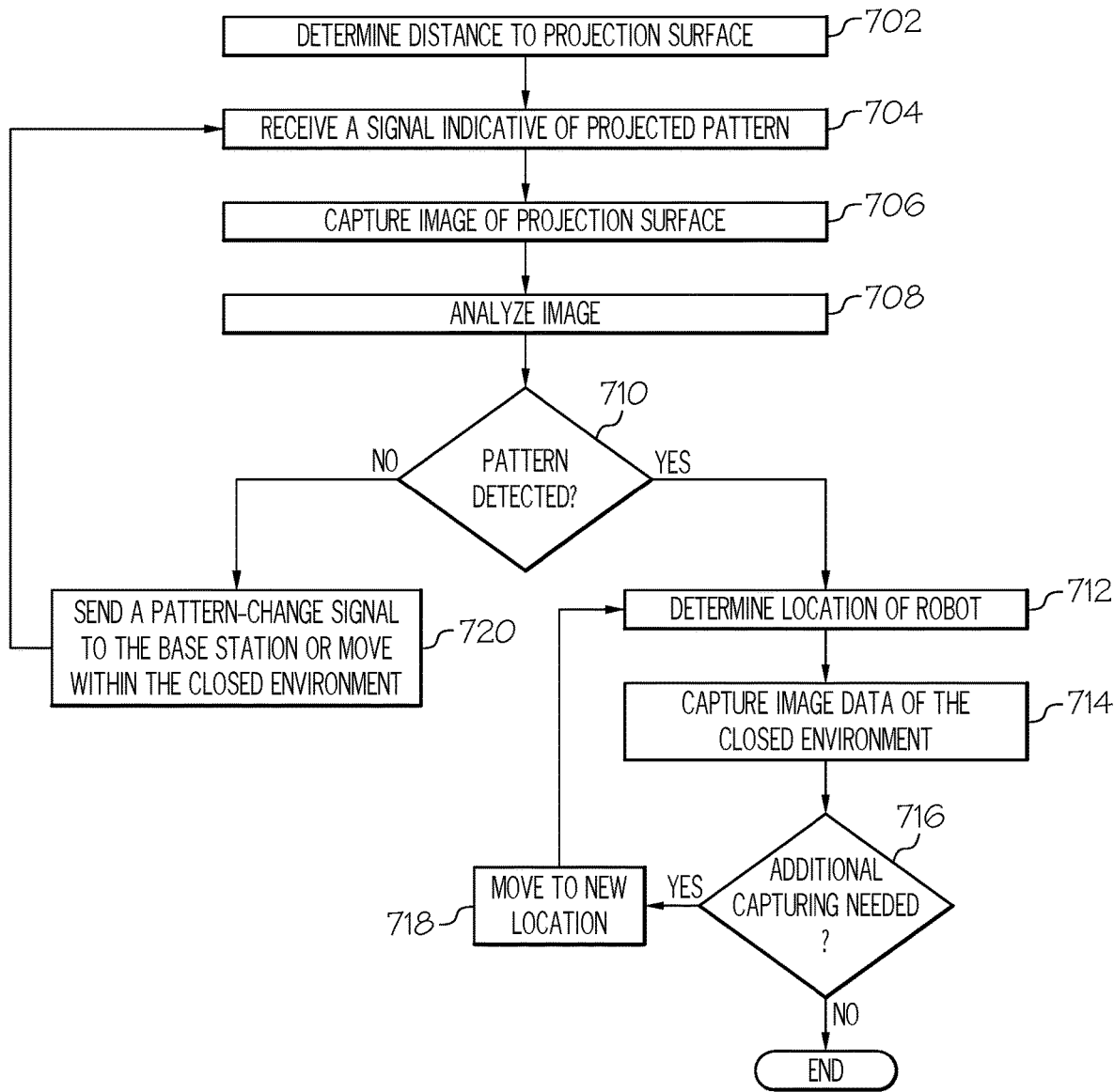
FIG. 7 depicts a flow diagram of an illustrative method of operating a base station in a closed space according to one or more embodiments shown and described herein.

Referring now to FIG. 7, a flow chart depicting a method for operating a system for remote visual inspection including a robot is described. The particular example embodiment described in FIG. 7 is not intended to limit the operation of the robot, the base station, and/or the external electronic device to any particular order or number of steps and additional or alternative steps are contemplated. It is to be understood that one or more of the steps described below, although explicitly described with respect to the robot, could be performed by one or more of the base station and the external electronic device in addition to or in place of the robot.

At block 702, the robot may determine a distance to the projection surface. For example, the robot may receive a distance from the distance finder of the base station. The robot may use the distance to the projection surface to determine an expected pattern. For example, the robot may use the distance to determine the number of expected pixels in between dots in the pattern or the robot may use the distance to sort through a number of images stored in a memory of the robot taken from a number of different distances from the projection surface to find a representative image of the pattern from a given distance and compare a real-time image of the projection surface to the images of patterns taken from various distances and positions (i.e., stored image data).

At block 704, the robot may receive a signal indicative of a projected pattern, for example, the base station may transmit a signal over a wireless connection to the robot indicating that the base station has projected a pattern, e.g., using the light emitter. The signal may include information such as the pattern, features, color, size, number of dots, and other features associated with the pattern (i.e., descriptive data about the pattern). For example, the robot may receive a signal from the base station that the pattern includes six dots. The robot may thus know that the target pattern includes six dots. The robot may proceed to search for the pattern on the projection surface as described below or may take one or more actions if it cannot detect the pattern. For example, the robot may move throughout the closed space until it detects a pattern having six dots (e.g., if one or more of the dots are occluded from detection and the robot can only detect four dots, it may continue to move until it detects six).

At block 706, the robot may capture an image (i.e., visual data) of a projection surface of a closed space (i.e., the robot's operating environment). The robot may use the imaging device (e.g., a camera) to capture the visual data. For example, the base station may project a pattern onto the projection surface of the closed space and the robot may capture visual data of the pattern with the imaging device. The imaging device may be one or more of one or more visual cameras, infrared cameras, and ultraviolet radiation cameras.

At block 708, the robot may analyze the image. For example, the robot and/or the base station may process the image data using one or more object and/or pattern recognition algorithms to analyze the image to detect the pattern. At block 710, the robot may determine whether a detected pattern is contained within the image. That is, the robot may analyze the image data using object or pattern recognition algorithms to determine whether the robot detects the pattern on the projection surface. In some embodiments, the robot receives a signal including data about the projected pattern from the base station in order to search for particular aspects of the pattern. In some embodiments, the imaging device may transmit the visual data to the robot processor to process the data over the communication path. In some embodiments, the robot communications module may transmit the visual data to an external network, such as a cloud or edge network to process the data and the external processor may detect the pattern and transmit data back to the robot. Accordingly, the robot may be in communication with one or more of the base station and the external electronic device while it is in operation.

In some embodiments, the robot may be configured to recognize a projected pattern based on only detecting a portion of the pattern and to take one or more actions based on the recognized portion. For example, if the robot detects only half of the pattern projected by the base station, the robot may be configured to recognize that only a portion of the pattern is projected and the robot may move to a location where it can image the entire pattern in order to orient itself within the environment. For example, the robot may compare an image to a bank of images (i.e., stored image data) in a non-transient processor readable storage medium and determine based on comparing captured image data to the stored image data that only a portion of the pattern is captured by the imaging device. In other embodiments, the robot may include a bank of partial images or partially occluded images to which it compares the captured image. The robot may compare the partial real-time image to the stored image to determine its location and determine where it needs to move to detect the entire image based on one or more of the orientation algorithms described above. In some embodiments, the robot may determine its location only by detecting the entire pattern.

If the robot does not detect the pattern on the image surface, the robot may send a pattern-change signal to the base station or move through the closed space in an attempt to detect the pattern as shown at block 720 as described in greater detail herein.

If, however, the robot does detect the pattern based on the analysis of the image of the projection surface, the system may determine a location and orientation of the robot with respect to the base station within the closed space based on the pattern at block 712. In some embodiments, the robot may calculate its location with respect to the base station based on the relative pose and geometry of the projected pattern as imaged by the robot. For example, the robot may determine its location with respect to the base station by measuring the distance between two features of the pattern (as determined by counting the number of pixels between the two features in the imaged data) and an angle from the robot to the pattern relative to a vertical or horizontal plane. Because the distance from the base station to the projection surface is known (i.e., using the distance finder), the distance between the projected pattern features is known, and the angle from the imaging device to the projected features is known, the position of the robot with respect to the base station can be determined.

For example, in one embodiment, the location of the robot may be determined with respect to the geographic position of at least two pattern features in a manner that is similar to celestial navigation. That is, the robot determines its position using angular measurements taken between at least two pattern features and a plane (e.g., horizontal plane or vertical plane) extending from the robot. The geographic position of a pattern feature is the location directly beneath each pattern feature on a floor of the space (e.g., a location of the base station when the base station projects the pattern directly above itself). The geographic position of each feature is known with respect to the base station because the position of each pattern feature is known with respect to the base station. The position of each pattern feature is known with respect to the base station because the angle relative to the floor of each feature and the angular position with respect to the base station can be set by the base station, as described herein.

The base station may direct at least two pattern features from the light emitter onto the projection surface, which can be detected by the imaging device of the robot. In certain embodiments, the pattern features are directed toward a ceiling. At least two of the pattern features may be transmitted with a known angle between the two pattern features with respect to the base station and at a given angle between the base station and a floor. In some embodiments, the angle between the features with respect to the base station can be set or changed by a user. By setting the angle between the features to a known value, the distance between the features at the projection surface can be determined, based on the distance between the base station and the projection surface. A flat projection surface is assumed for the purpose of this calculation, as is a flat floor that may be parallel to the projection surface.

As the robot moves within the space, it detects the pattern features emitted by the base station (e.g., a visual detection). The robot processor may convert the pattern features sensed by the imaging device into bearings from the robot to the features. The processor can then calculate representative angles and azimuths of the signals to determine the location of the robot within the space.

Accordingly, the robot may determine a distance to each geographic location based on the height of the projection surface (as measured by the distance finder) and the angle between the pattern feature and the point-of-view of the robot. The distance to the geographic location of an individual pattern feature is the distance of the projection surface multiplied by the tangent of the angle between the point-of-view of the robot and the pattern feature on the projection surface. By calculating the distance to at least two geographic locations of different pattern features, the robot can triangulate its position in the space with respect to the base station. The position of the robot may be continuously tracked with respect to the base station by continuously determining the location of the robot as described above. As the robot moves around the closed space and determines the relative position of various objects with respect to the base station, the position of the robot with respect to the objects in the room can also be determined, as described in greater detail herein.

In another embodiment, the robot may determine its location by comparing a captured image or scan of the pattern to a baseline image (e.g., stored in a hard drive of the robot) and measure the distance between the pattern features in the captured image versus the distance between pattern features in the baseline image. That is, the robot may include a bank of images that include reference data (e.g., images of a projected pattern that were taken from a known distance to the ceiling). In one illustrative embodiment, the robot may measure the distance (i.e., the number of pixels) between the features in the pattern in the stored image to determine a baseline distance at the reference distance associated with the reference image. The robot may compare the number of pixels between features of the pattern in the real-time image and the real-time distance to the ceiling to the number of pixels and distance in the reference image to determine the robot's location. In some embodiments, a match between the stored image data and the real time image data may be compared to reference location values in a look up table stored in, for example, the storage device.

In some embodiments, the robot communications module may transmit the visual data to an external network, such as a cloud or edge network to process the data and the external processor may detect the pattern and transmit data back to the robot. Accordingly, the robot may be in communication with one or more of the base station and the external electronic device while it is in operation.

At block 714, the robot may capture image data of the closed space. In some embodiments, the image data may be processed and recorded by the external electronic device. The captured data may be sent to the external electronic device in real time (e.g., with a wireless connection) or may be stored in a hard drive of the robot and downloaded to the external electronic device. The image data may be processed by one or more of the robot, the base station, and the external electronic device to generate an initial image of the closed space.

At block 716, the robot may determine whether additional image capture is necessary. The robot may determine whether additional image capture is necessary, for example, using an object or pattern recognition algorithm. For example, the robot may determine that all of the space within the closed space has been captured in image data based on an input from the user. Alternatively, the robot may determine that one or more boundaries of the space have not been determined and may travel to a location where the robot can capture images of the boundaries.

At block 718, the robot may move to a new location if it is determined that additional image capture is required. For example, the robot may energize a motorized wheel assembly to travel from the first location to a second location. The robot may be able to track its location within the closed space with relation to the base station based on imaging the pattern. The robot may continue to update location data as it moves from the first location to the second location and subsequent locations throughout the environment. Additionally, as the robot moves throughout the environment, gaining visual perspective regarding the size, shape, and classifications of objects within the environment, the robot generates data that can be used to generate a visual map of the environment with respect to the location of the base station as described in greater detail herein.

The robot may capture image data of the closed space and a map of the closed space may be continuously built (i.e., rendered) based on the image data from the robot. That is, an image of the closed space may be generated on the external electronic device using the image data captured at the first location and at the second location. The map building may be carried out using one or more object or facial recognition algorithms that recognize and classify objects in the closed space. The walls and other boundaries of the closed space may be mapped using the image data from the robot and data representing the arrangement and size of the objects within the boundaries of the closed space may be used to generate the map.

At block 720, the robot may transmit a pattern-change signal to the base station or move to a second location if it cannot detect the pattern after a certain amount of time. For example, the robot may transmit a pattern-change signal to the base station after five seconds of not being able to visually detect the pattern. The robot may transmit the pattern-change signal over the wireless connection between the robot and the base station. In some embodiments, the robot may move from a first location to a second location and/or one or more other locations in an attempt to detect the pattern before it transmits a pattern-change signal to the base station. The pattern-change signal may cause the base station to change one or more characteristics of the pattern as described in greater detail herein. The pattern change signal may cause the base station to project a pattern in the first place (i.e., if it had not been projecting a pattern at all) or to move the projected pattern from one location on the projection surface to another or from one surface to another (e.g., if the projection is occluded). If the robot sends a pattern change signal to the base station, it may receive an updated signal indicative of a new projected pattern and the system may repeat the process described herein from block 404.

It should now be understood that a system for remote visual inspection of a closed space may include a base station that may emit a pattern onto a projection surface of a closed space, a robot including a camera on a moveable base, and an external electronic device that may include a display for displaying one or more images generated from captured image data that is captured using the camera mounted on the robot. The system can be used to remotely inspect the contents of the closed space, enabling the users to determine whether a space should be entered or not. In the instance where the space would otherwise be hazardous to enter, the system may prevent unnecessary entry.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system for remote visual inspection of a closed space, comprising:
a base station comprising a distance finder and a light emitter, the base station determining a distance to a projection surface using the distance finder and projecting a pattern onto the projection surface of the closed space, the pattern being alterable or movable to another location by the base station upon receipt of a pattern change signal;
a robot comprising a moveable base supporting an imaging device, the robot configured to:
utilize the imaging device to capture an image of the pattern,
when an entirety of the pattern is not captured due to a blockage, transmit the pattern change signal to the base station and capture another image of the pattern after being altered or moved by the base station,
determine a location of the robot with respect to the base station based on characteristics of the pattern, and
capture image data of the closed space; and
an external electronic device communicatively coupled to the robot and located outside the closed space, wherein the external electronic device executes an algorithm to classify one or more objects within the closed space based on the image data and displays images and one or more classified objects based on the image data.

2. The system of claim 1, wherein the external electronic device determines a location of the one or more objects in the closed space from the image data captured by the robot.

3. The system of claim 2, wherein the external electronic device generates a map of the closed space, displays the map of the closed space, and continuously updates the map.

4. The system of claim 1, wherein the robot is further configured to compare the pattern to a baseline image of the pattern to determine the location of the robot.

5. The system of claim 1, wherein the robot is further configured to:
move to a second location within the closed space,
determine the second location of the robot within the closed space based on the pattern, and
capture second image data of the closed space at the second location.

6. The system of claim 5, wherein the robot captures the image data as it moves from the location to the second location.

7. The system of claim 1, wherein the imaging device comprises a thermal imaging device.

8. The system of claim 1, wherein the robot is further configured to transmit a detection signal to the base station based on detecting the pattern with the imaging device.

9. The system of claim 1, wherein the robot moves to a second location when the pattern is not detected.

10. A robot, comprising:
an imaging device; and
a control unit that causes the robot to:
determine a first location of the robot based on a pattern projected on a projection surface;
capture first image data at the first location;
move to a second location;

determine the second location of the robot based on the pattern projected on the projection surface;

capture second image data at the second location; and transmit the first image data and the second image data to an external electronic device for display, wherein the external electronic device executes an algorithm to classify one or more objects around the robot based on the first image data and the second image data and displays one or more classified objects with the first image data and the second image data, wherein, when an entirety of the pattern is not captured due to a blockage, the control unit:

causes the robot to transmit a pattern change signal to a base station projecting the pattern, thereby causing the pattern to be altered or moved, and causes the robot to capture another image of the pattern.

11. The robot of claim 10, wherein the control unit further causes the robot to capture third image data as the robot moves from the first location to the second location.

12. The robot of claim 11, wherein the imaging device comprises a thermal imaging device.

13. The robot of claim 10, wherein the control unit further causes the robot to compare the pattern to a baseline image of the pattern to determine the location of the robot.

14. The robot of claim 13, wherein the baseline image is stored in the memory module.

15. The robot of claim 13, wherein the baseline image is stored on an external storage device.

16. The robot of claim 13, wherein the control unit further causes the robot to transmit a detection signal based on detecting the pattern with the imaging device.

17. A method of generating image data of a closed space, the method comprising:

projecting a pattern on a projection surface of the closed space;

capturing first image data of the closed space with a robot at a first location;

when the first image data does not include the entirety of the pattern due to a blockage, transmit a pattern change signal to cause the projected pattern to be moved or altered, and capturing alternate first image data;

determining the first location of the robot within the closed space based on the first image data or the alternate first image data including the pattern;

moving the robot to a second location within the closed space;

capturing second image data of the closed space with the robot at the second location, wherein the second image data includes the pattern;

determining the second location of the robot within the closed space based on the second image data including the pattern;

generating an image of the closed space based on the first image data and the second image data;

executing an algorithm to classify one or more objects within the closed space based on the first image data and the second image data; and displaying the image of the closed space and one or more classified objects on an external electronic device.

18. The method of claim 17, wherein one or more of capturing the first image data and capturing the second image data comprises capturing thermal image data.

19. The method of claim 17, wherein determining the first location of the robot within the closed space based on the first image data including the pattern comprises comparing the first image data including the pattern to stored image data including the pattern.

\* \* \* \* \*